United States Patent [19]

Fieldler et al.

[11] Patent Number: 5,182,531

[45] Date of Patent: Jan. 26, 1993

[54] INTERFERENCE PROTECTED ELECTRONIC APPARATUS

[75] Inventors: Gerhard Fieldler, Neckartailfingen; Gerhard Conzelmann, Leinfelden-Oberaichen, both of Fed. Rep. of Germany

[73] Assignee: Robert Bosch GmbH, Stuttgart, Fed. Rep. of Germany

[21] Appl. No.: 477,979

[22] PCT Filed: Jan. 24, 1989

[86] PCT No.: PCT/DE89/00039

§ 371 Date: Apr. 27, 1990

§ 102(e) Date: Apr. 27, 1990

[87] PCT Pub. No.: WO89/07373

PCT Pub. Date: Aug. 10, 1989

[30] Foreign Application Priority Data

Jan. 30, 1988 [DE] Fed. Rep. of Germany ....... 3802822

[51] Int. Cl.$^5$ .............................................. H03H 7/00
[52] U.S. Cl. .................................. 333/167; 333/184; 333/185
[58] Field of Search ............... 333/167, 184, 185, 12, 333/181, 169, 170, 171, 172, 81 R, 138, 204

[56] References Cited

U.S. PATENT DOCUMENTS

| | | | |
|---|---|---|---|
| 4,737,739 | 4/1988 | Rosier et al. | 333/138 X |
| 4,758,805 | 7/1988 | Yamazaki et al. | 333/12 |
| 4,875,457 | 10/1989 | Fitzner | 333/12 X |

Primary Examiner—Paul M. Dzierzynski
Assistant Examiner—Ali Neyzari
Attorney, Agent, or Firm—Michael J. Striker

[57] ABSTRACT

An electronic device is suggested which comprises a signal emitting circuit part (1) and a signal processing circuit part (4), at least one line for supplying the signal processing circuit part (4) with operating current and-/or at least one signal input line (6) and/or at least one signal output line being guided to the signal processing circuit part (4) from an external circuit. The device includes at least one filter circuit (7) which is connected to the signal processing circuit part (4) and inserted into the signal line (6). The filter circuit (7) comprises additional damping elements for the associated line (6) for damping interference voltage induced by of external high-frequency fields. The amplitude of the interference voltage is greater, preferably substantially greater, than a linear control range of circuit elements of the signal processing circuit part (4). Damping elements and filter circuits are monolithically integrated together with the signal processing circuit part (4). The teaching of the invention is also to be applied to the signal emitting circuit part (1) insofar as the induced interference voltage influences its signal output.

30 Claims, 10 Drawing Sheets

SIGNAL EMITTING DEVICE

SIGNAL PROCESSING CIRCUIT PART

INTERFERENCE PROTECTED ELECTRONIC APPARATUS

PRIOR ART

The invention is directed to an interference protected electronic device including a signal processing circuit part to which lines are guided from external circuits, specifically at least one line for supplying operating current or voltage, at least one line for signal inputs and/or a line for signal outputs, and circuit means assigned to at least one line of the signal processing circuit part and constructed as a filter circuit, for damping high-frequency interference voltage which is induced by external electromagnetic fields and whose amplitude is greater than a linear control range of circuit elements of the signal processing circuit part.

Such appliances are already known, e.g. from U.S. Pat. No. 4,668,873. The signal parts of these appliances can contain electronic transformation elements such as operational amplifiers and comparators serving to process the signals, multivibrator circuits serving as pulse shapers, digital circuit parts or the like.

The known appliances of the type named in the beginning utilize filter circuits which are constructed with discrete components using printed circuit board technology, but also in hybrid construction on ceramic substrates. Interference voltage can be damped to the desired degree with such filter circuits; they are therefore usable in principle, e.g. also in motor vehicles, where interference voltage with a high amplitude in a broad frequency range e.g. between 150 KHz and 1 GHz always occur at least as soon as the motor vehicle moves in the near field of a high-power transmitter.

If such systems are monolithically integrated at least as partial systems, this means that the filter circuits must also be monolithically integrated. In so doing, the following problem arises: rectified voltage occurs at the p-n junctions of the transformation elements serving to process the signals in the signal processing circuit part which rectified voltages shift the operating points of these transformation elements, which leads to operating errors of, the circuit parts.

SUMMARY OF THE INVENTION

The present invention is characterized in that the circuit means, which are assigned to at least one line, are monolithically integrated, comprise elements for damping high-frequency interference voltage, and are constructed in such a way that interference voltage in the range of the greater amplitudes does not generate any rectified voltage or rectified current which noticeably shifts the operating points of circuit elements of the signal processing circuit part.

The electronic device, according to the invention has the advantage that interference voltage having a higher amplitude in the frequency range in question, preferably between 150 KHz and 1 GHz, is also damped in such a way that it does not lead to rectified voltage or rectified current which noticeably shifts the operating points of the circuit elements of the signal processing circuit part.

The invention is explained in more detail with the aid of the drawing.

DESCRIPTION OF THE PREFERRED EMBODIMENTS

Figure 1:
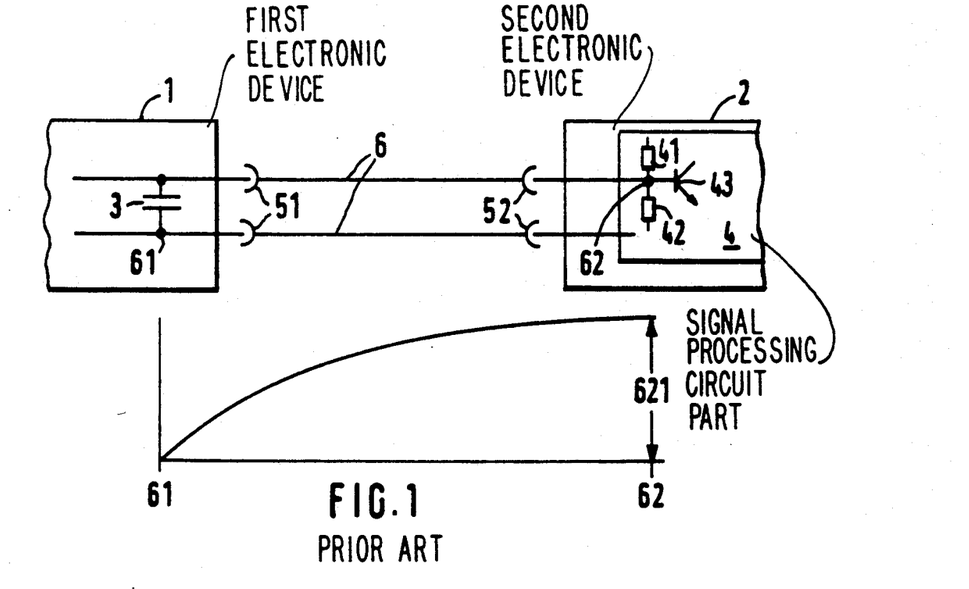
FIG. 1 shows a known arrangement of a first and second electronic device, wherein both devices are connected with one another by means of plug-in connection lines.

The occurrence of interference voltage and conventional interference suppression will be described first, at least in rough outline with the aid of FIGS. 1 to 4. FIG. 1, a first electronic device is designated by 1 and a second electronic device is designated by 2; the two devices are connected with one another to form a system by means of the plug-in connections 51 and 52 and the line 6. In order to obtain simple relations, a capacitor 3 of sufficient magnitude is located at the output of the device 1 between the two conductors of the line 6; the electronic partial circuit 4 of the device 2 connected to the line 6, which device 2 comprises components (resistors 41 and 42 and transistor 43), shown here symbolically, has a high resistance relative to the wave or characteristic impedance of the line 6; the electrical length of the line 6 is given by means of the distance between the line points 61 and 62.

Under these conditions, the line 6 is short circuited at location 61 but substantially open at location 62. It constitutes a formation which is capable of resonance, such as a Lecher or antenna system; if this is exposed to an electromagnetic field of a matching frequency a standing wave occurs. The diagram in FIG. 1 shows the amplitude characteristic over the electrical length 61, 62 for the fundamental wave; the corresponding harmonics are not shown for the sake of simplicity. The amplitude is 0 at 61 due to the short circuit and is a maximum at 62 due to the open circuit, which maximum is indicated by arrow 621. At the field strengths of up to 100 V/m, possibly se hundred V/m, in question here, maximum amplitudes of up to several hundred V can occur insofar as limiting factors do not prevent this. The coupling is capacitive toward low frequencies, the amplitudes also decrease quickly because of the capacitor 3. In the absence of the capacitor 3, the fundamental wave is given by a half-wave excitation; a potential loop occurs at 61, the zero passage is at half the distance 61, 62. Of course, other coupling mechanisms are also conceivable.

Figure 2:
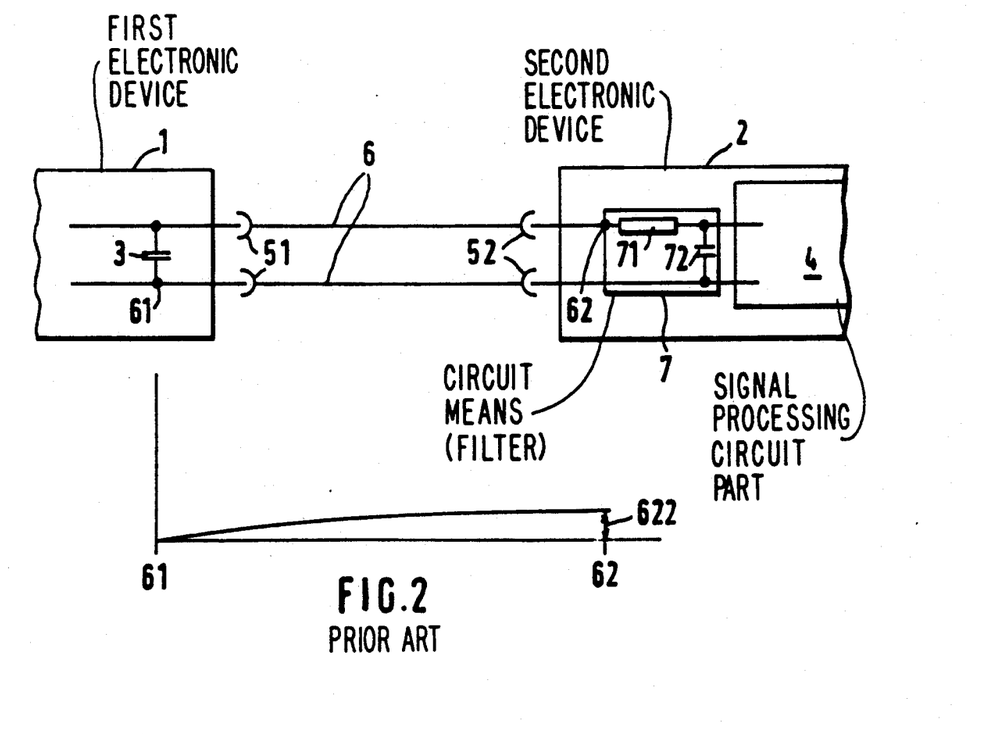
FIG. 2 shows the same arrangement as in FIG. 1, but with the addition, of a filter circuit.

In FIG. 2 a filter circuit 7, which can comprise an ohmic resistor 71 and a capacitor 72 in the simplest case, as in this instance, is added to the arrangement according to FIG. 1; much more complex filter circuits comprising feedthrough capacitors, chokes, etc. are often required in order to ensure the operation of the total system. In the present example, reference is made to the simplest filter circuit co the circuit elements 71 and 72.

The wave or characteristic impedance of connection lines in motor vehicles is approximately at an order of magnitude between 30 and 300 ohms; typically approximately 100 ohms.

If the resistor 71 is in this range and the capacitor 72 has low inductance and if its capacitance is sufficiently great, the line 6 is damped approximately aperiodically, the resonance step-up disappears; only the considerably lower amplitude 622 is reached. Since the filter circuit 7 must have a very wide band, the capacitance of the capacitor 72 is high. Due to the spatial dimensions of the filter and the consequent parasitic line inductances, particularly also in the interconnection of the electronic partial circuit 4, such filters are difficult to master when using integrated hybrid technology. However, with monolithic integration even a complex filter circuit can be accommodated on less than a square millimeter of surface, so that the line inductances are very much smaller and accordingly easier to master. The problems here arise in that only capacitors of small capacitance can be integrated economically; that is, the filters are highly resistive; moreover, care must be taken that no rectified voltage occurs at the p-n junctions of components of the filter, which p-n junctions are now unavoidable, and also that there is no considerable rectified current flow resulting in rectified voltage.

In device combination 1, 2 without capacitor 3, where the interference voltage induced on the line 6 may not influence either device 1 or device 2, the teaching of the invention is to be applied on both sides e.g. as in the arrangement of a voltage regulator for a rotary current generator with a voltage sensor and/or active temperature sensor at the vehicle battery.

Figure 3:
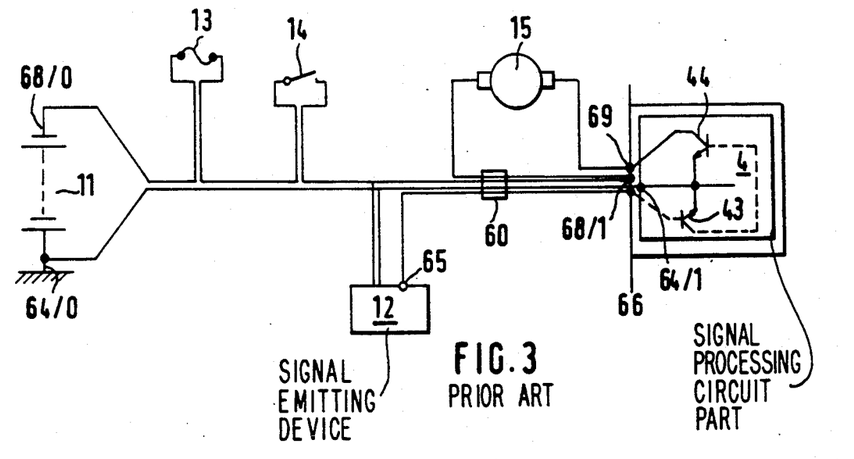
FIG. 3 shows, by way of example, an electronic device which is connected with a vehicle battery on the one hand by means of a cable harness and via safety fuse and switch and, on the other hand, with a second electronic device on the input side and with an engine on the output side.

FIG. 3 shows a line arrangement specific to motor vehicles for regulating or controlling the speed of an electric motor 15 and the respective cable harness 60 for the arrangement, also designated are the vehicle battery 11 with its ground connection 64/0 and its positive pole 68/0, a signal emitting electronic device 12 with its signal output 65, a safety fuse 13, a switch 14 and, as a second device, a monolithic integrated current regulator 4 with the signal input 66, the ground connection 64/1, the operating voltage connection 68/1, the signal input 66, the motor output 69 and the two transistors 43 for the input circuit and 44 for the output stage, which transistors 43, 44 are shown symbolically.

Figure 4:
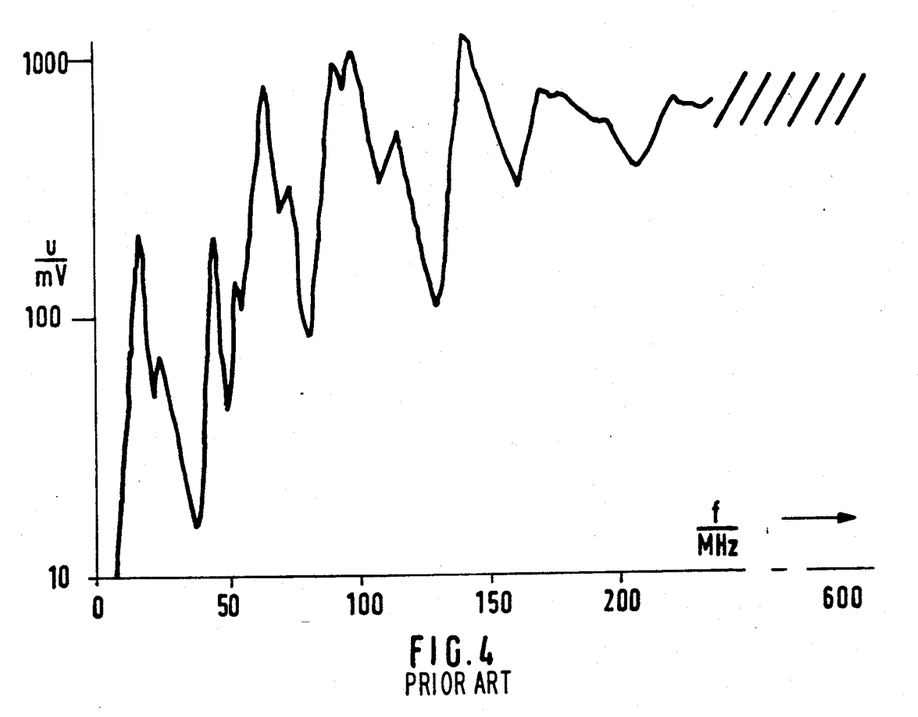
FIG. 4 shows the amplitude ch other the frequency for the complex line system of FIG. 3.

With reference to the signal line 65–66, the cable harness 60 constitutes a considerably complex system of coupled circuits of different natural frequency and damping as seen in terms of high-frequency technology. If the partial circuit 4 is isolated from the cable harness, the frequency response can be measured. In the diagram of FIG. 4, the amplitude at the measurement point 66 to ground 64/1 is plotted in logarithmic scale at constant induction as a function of the frequency in linear scale. According to Foster's reactance theorem, "maxima" alternate with "minima" and "intermediate maxima" alternate with "intermediate minima"; the first parallel resonance is approximately at 15 MHz, that with the lowest damping at approximately 100 MHz and 150 MHz with a damping factor of 0.03, which corresponds to a resonance step-up of more than 30 times; above 200 MHz, maxima and minima remain at a high level within the indicated amplitude range.

At the possible field strengths of up to more than 100 V/m, voltage amplitudes are induced in order of magnitude above the linear control range of semiconductor circuits and to a still greater degree over the blocking voltage of capacitors which can be produced with monolithic integration. It is therefore advantageous not only to damp the signal line at its end 66, but, if possible, also the line for the operating voltage 68/1 and the output line 69, that is, if possible, the total "cable harness" system.

Figure 5A:
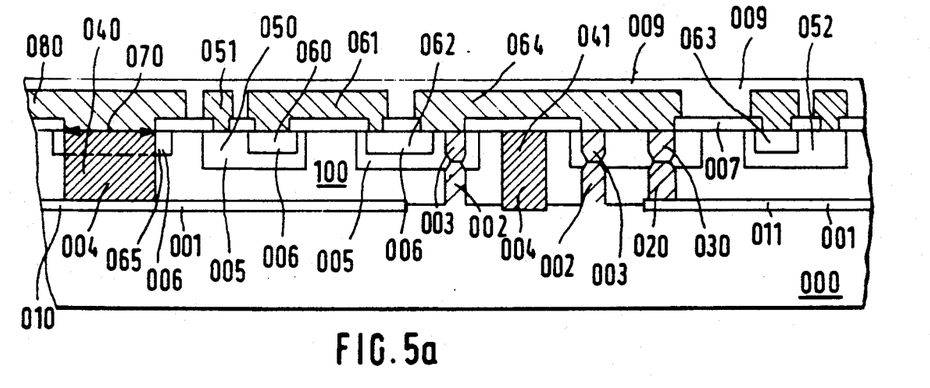
FIG. 5A shows the section of and FIG. 5b shows the layout of an exemplary bipolar process for showing the subject matter of the invention.
Figure 5B:
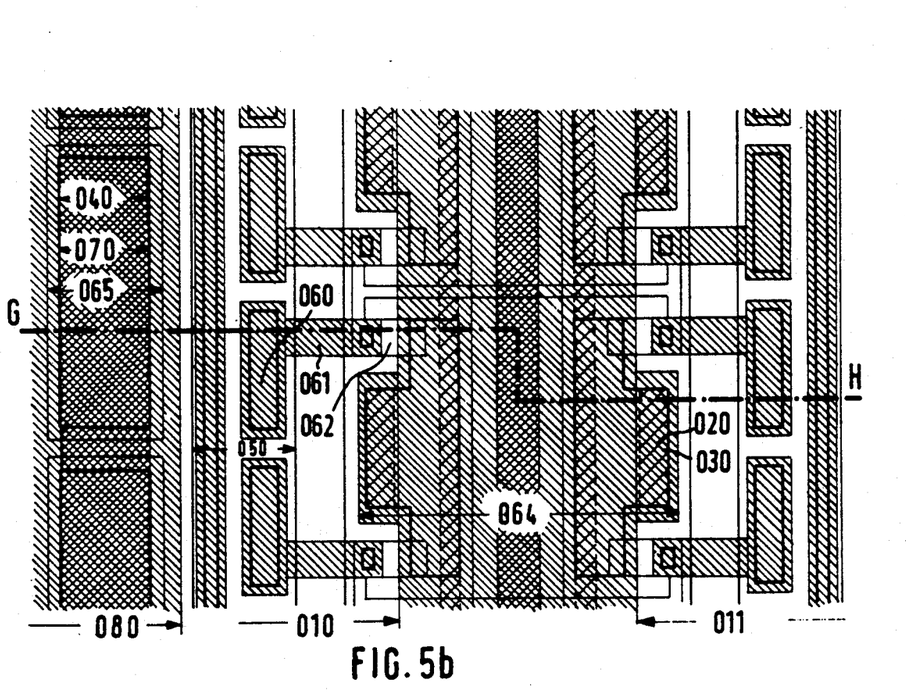

FIGS. 5a and 5b show a possible design for implementing the invention without the staggering or mutual displacement due to undercutting and underdiffusion, with the aid of the sectional diagram and layout of (not entirely) two half cells of a power transistor which contains diode elements in its cells, which diode elements act as damping capacitors.

The following designations are given:

| | |
|---|---|
| 000 | substrate |
| 001 | "buried layer" |
| 002 | lower isolating diffusion |
| 100 | epitaxy |
| 003 | upper isolating diffusion |
| 004 | collector contact diffusion |
| 005 | base diffusion |
| 006 | emitter diffusion |
| 007 | cover oxide |
| 008 | metallization |
| 009 | protective layer |
| 070, 090 | contact window in the planes 007, 009 |

The hatching of the two isolating diffusions 002, 003 is widely spaced from the bottom left to top right, that of the collector contact diffusion 004 is closely spaced from bottom left to top right, that of the textured metal 008, on the other hand, is from top left to bottom right. The protective layer 009 can consist of a silane oxide or plasma oxide or plasma nitride; it is not required for understanding the arrangement.

FIG. 5a shows a section along the line GH of FIG. 5b. FIG. 5b is the plot of the respective layout in the same view. The heaviest lines show the outlines of the contact window, the two lightest lines show the outline of the emitter and buried layer. The base is drawn in only slightly lighter than the contact window. Together with the section according to FIG. 5a, the corresponding regions can be assigned unequivocally.

The following designations are given: buried layer of a cell of the power transistor 010, its collector contact with the collector contact diffusion 040, the respective contact window 070, the collector contact line 080, the base diffusion region 050 with the base contact line 051, the emitter diffusion region with the emitter 060, the connection line to the emitter resistor 061, an emitter resistor 062 formed with the emitter diffusion region, the emitter and ground line 064, the isolating diffusion 002, 003, a diffused signal line 041 which is not required in this instance; also, the components of the adjacent half cell are designated as follows: the buried layer 011, the lower isolating diffusion region 020 on top of the latter, the connection contact 030 for the lower isolating diffusion region, constructed with the upper isolating diffusion, and another base diffusion region 052 with emitter 063, as well as protective layer 009.

The lower isolating diffusion 020 on top of the buried layer 011 forms a diode element which is integrated into the power transistor; the power transistor contains a plurality of such elements, so that a unipolar capacitor of considerable capacitance is produced which acts at the output of the circuit 4, point 69, and effectively loads the line system, which otherwise only comes about in the special case of saturation of the power transistor.

Figure 6A:
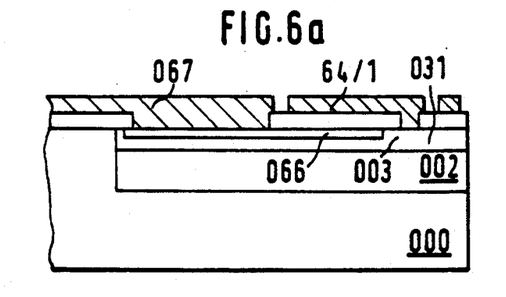
FIGS. 6a, b, 7a, b and 8a, b show an exemplary implementation of capacitors in the device of FIGS. 5a and 5b.
Figure 6B:
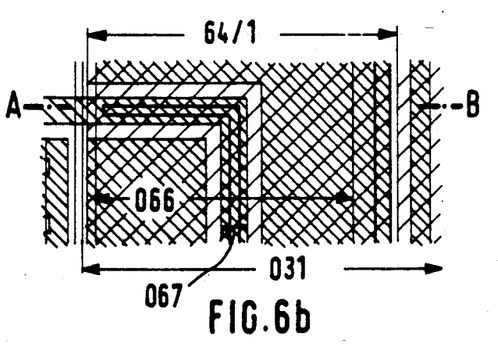
Figure 7A:
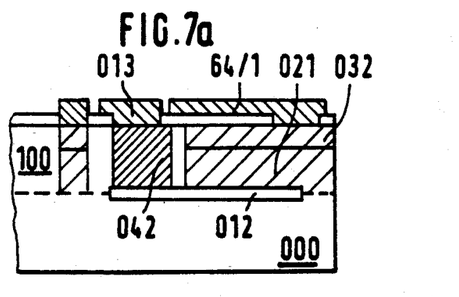
Figure 7B:
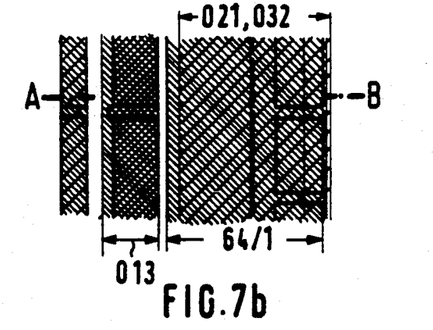
Figure 8A:
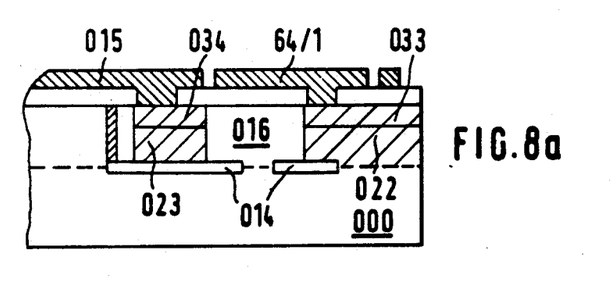
Figure 8B:
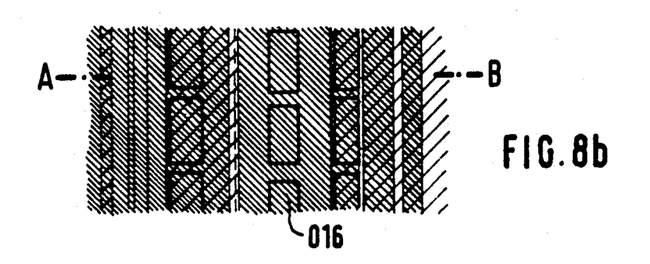

FIGS. 6a, 7a, 8a show a section along the line AB of FIGS. 6b, 7b, 8b. There are three possible embodiment forms for capacitors in the process described in FIG. 5, i.e. unipolar in FIGS. 6 and 7 and bipolar in FIG. 8. Of course, other diffusion regions can also be utilized for the formation of capacitors. The highest possible capacitance per unit length on the one hand and a sufficiently high breakdown voltage of the depletion layer on the other hand are decisive for this selection.

In FIG. 6, an upper isolating diffusion region is designated by 031, an emitter diffusion region introduced into the latter is designated by 066, the ground connection connected with 031 is designated by 64/1, and the connection of the hot electrode of the capacitor connected with the emitter diffusion region 066 is designated by 067, the capacitance of the capacitor being formed by means of the depletion layer provided by the regions 031, 066. This unipolar capacitor can also be used for negative blocking voltage, insofar as the lower isolating diffusion region is omitted.

In FIG. 7, a buried layer diffusion region is designated by 012, a lower isolating diffusion region is designated by 021, an upper isolating diffusion region is designated by 032, the ground connection is designated by 64/1, a collector contact diffusion region is designated by 042, and the hot contact of the capacitor is designated by 013; the latter is formed by means of the depletion layer lying between 012 and 021. The buried layer diffusion region 021 is connected with the hot contact 013 by means of the collector contact diffusion region 042, and with the ground connection by means of 032. The depletion layer formed between the substrate 000 and the buried layer diffusion region 012 also makes a small contribution to the capacitance. This unipolar capacitor possesses a higher blocking voltage than that according to FIG. 6; however, it can not be isolated relative to the substrate.

In FIG. 8, a buried layer diffusion region is again designated by 014, a first and a second lower isolating diffusion region are designated by 022 and 023, respectively, a first and a second upper isolating diffusion region are designated by 033 and 034, respectively, a cut out portion in the buried layer diffusion 014 is designated by 016, the ground connection is designated by 64/1, and the contact for the hot electrode is designated by 015. The capacitance coating of this capacitor is formed between the two counterconnected depletion layers 022 and 014, 014 and 023, respectively; accordingly, it is bipolar and therefore suitable for the input circuits of the filter. Rectified voltage first occurs when the amplitude of the high-frequency interference voltage and e.g. superimposed d.c. voltage exceed the breakdown voltage of the symmetrical depletion layers or when the two partial capacitors 022-014 and 014-023 are of unequal magnitude. The cut out portions 16 in the buried layer diffusion are introduced in order to increase the series resistance of the capacitor, they are not obligatory.

Figure 9:
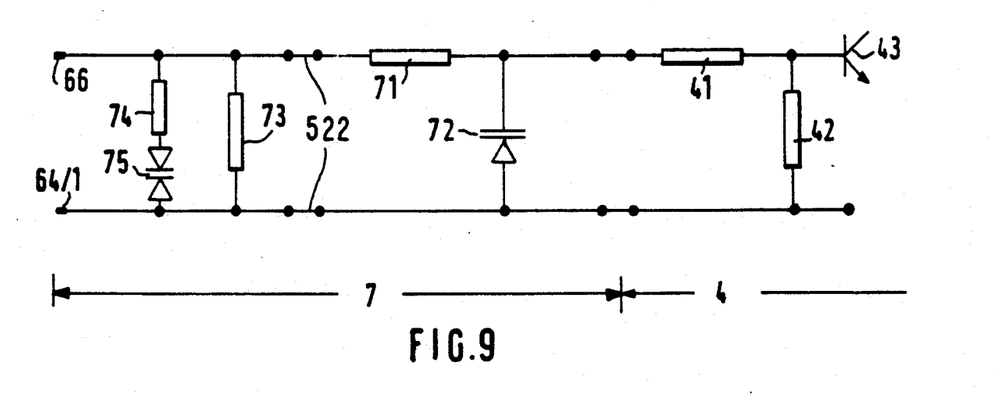
FIG. 9 shows the equivalent circuit of a first embodiment example of a monolithic integrated filter circuit acting in the manner of the circuit according to FIG. 2.

FIG. 9 shows the circuit arrangement of FIG. 2 in monolithic integrated construction. Again, the electronic partial circuit connected to the filter circuit is designated by 4, the filter circuit with the resistor 71 and the capacitor 72, as low-pass filter, is designated by 7; the terminals 522 correspond to the terminals 52 of FIG. 2; a necessary addition of the resistors 73, 74 and the capacitor 75 is added to the original filter, the input for the hot terminal is designated by 66 and the input for the ground terminal is designated by 64/1 corresponding to FIG. 3. This addition ensures adaptation to the new conditions. The capacitor 72 is smaller by several orders of magnitude, the resistor 71 is accordingly more highly resistive than that in FIG. 2. In a practical example the capacitor 72 is 100 pF and the resistor 71 is 40 kiloohms. The sum of the resistors 41 and 42—in the case of adaptation which need not to be unconditionally maintained—is likewise at 40 kiloohms. In general, the appliance 2 requires an input resistance of approximately 5 kiloohms, but this is not to be maintained directly due to the high-impedance low-pass filter; therefore, the resistor 73 which, in this example, preferably has a resistance of 5.33 kiloohms, is connected in parallel to the input; this value is effective as a high-pass filter for low frequencies with the capacitive line and because of its low coupling capacitance, but for the critical range of higher frequencies it is still too highly resistive relative to the wave impedance of the line 6 and the connection line 65-66 of the cable harness 63 in FIG. 3. The adaptation is effected with the resistor 74, to which the capacitor 75 is connected in series, in order, on the one hand, to obtain the required input resistance of 5 kiloohms for the low operating frequency of the signal voltage, but also, on the other hand, to produce the resistor 74 with small surface areas in layout if the appliance is to withstand a faulty connection of the signal line e.g. to the operating voltage without sustaining damage. The capacitance of the capacitor 75 must be selected so as to be great enough so that the line is sufficiently damped for natural frequencies with relatively high amplitude maxima. For example, the resistor 74 has a value of approximately 80 ohms and the capacitor 75 accordingly has a value of approximately 40 pF for the cable harness 63 with critical natural frequencies above 50 MHz.

Figure 10:
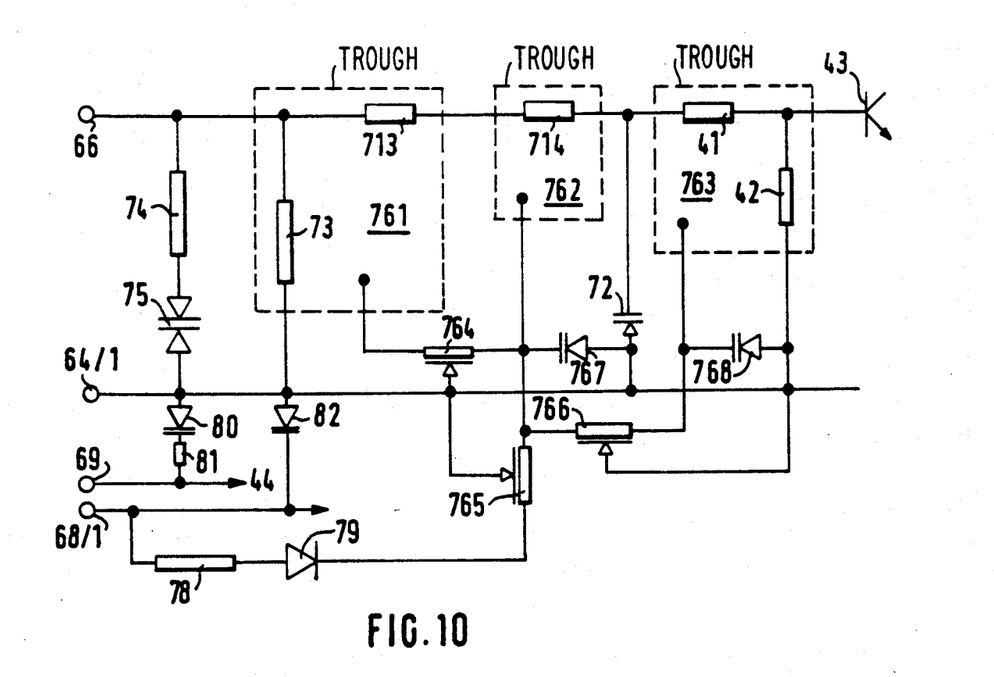
FIG. 10 shows the respective circuit in integrated form with its layout according to FIG. 11.

FIG. 10 shows the circuit of a complete arrangement, according to the teaching of the invention, which also takes into account the crosstalk between individual components. The resistor 71 is divided into two partial resistors 713 and 714 which are accommodated in separate resistor troughs 761, 762; the resistor 713 which is "still hot" lies in a trough 761 with the resistor 73 which is parallel to the input, and the resistor 714 lies in a trough 762 so as to be separated from the latter.

The resistors of the filter are constructed, according to the invention, e.g. with the p-type base diffusion 005 of the process; they lie in troughs of the epitaxy 100 which are insulated relative to the depletion layer and accordingly form a p-n junction relative to the latter. The invention further provides that these p-n junctions are reverse biased to the extent that they are not polarized in the flow direction by means of occurring interference voltage. The operating d.c. voltage of the appliance or the integrated circuit itself is used as a bias voltage source. If the latter are too low, a voltage multiplier circuit is to be used - if necessary, with a somewhat more inherently stable output voltage or with a voltage stabilizer connected subsequently. In addition, it is advantageous to connect a diode in the flow direction in the connection line from the bias voltage source to the blocking p-n junction. If the HF amplitude exceeds the bias voltage, only rectified current flows in order to charge the small capacitance of the trough to a higher level; its residual current, which generates losses, is very small, as is known. Therefore, it can also be sufficient to produce the bias voltage of the blocking p-n junction in a floating trough by means of the high-frequency interferenoe voltage itself, wherein a parasitic p-n junction acts as a diode; that is, a separate diode is not absolutely necessary.

The components of the filter on the input side, which are exposed to the highest interference voltage, couple the latter capacitively in their troughs; it is therefore provided to prevent crosstalk via the bias voltage source to other circuit parts by means of at least one resistor in the line section.

The filter of FIG. 10 is constructed in a corresponding manner. The resistor 78 is connected, on the one hand, to the operating voltage source 68/1, whose voltage is sufficient for the provided purpose, and, on the other hand, to the diode 79; the lines 764 and 765, which are equipped with resistance and capacitance coatings, lead from the diode 79 to the troughs 761 and 762; the lines 764, 765 and 766 are constituted by buried layer diffusion regions 001 which lie below regions with the lower isolating diffusion 002, wherein the regions 002 are connected to the ground line 64/1 via upper isolating diffusion regions 003. The trough 62 is connected to ground by an additional capacitor 767, while the trough 763 is connected to ground by the capacitor 768; both capacitors can be accommodated in the layout at the chip surface without additional expenditure. For the purpose of improved decoupling, the trough 763 in which the most sensitive resistors, namely 41 and 42, are accommodated is connected via the line 766 to the trough 762 rather than directly to the diode 79.

The filter circuit 7 is effectively reinforced by means of the lossy capacitor 80, the series resistor 81 parallel to the collector-emitter junction of the power transistor 44, and the capacitor 82 between the positive pole 66 and the negative pole 64/1 of the operating voltage, whose loss resistance is effectively formed by the current consumers of the total circuit.

Figure 11:
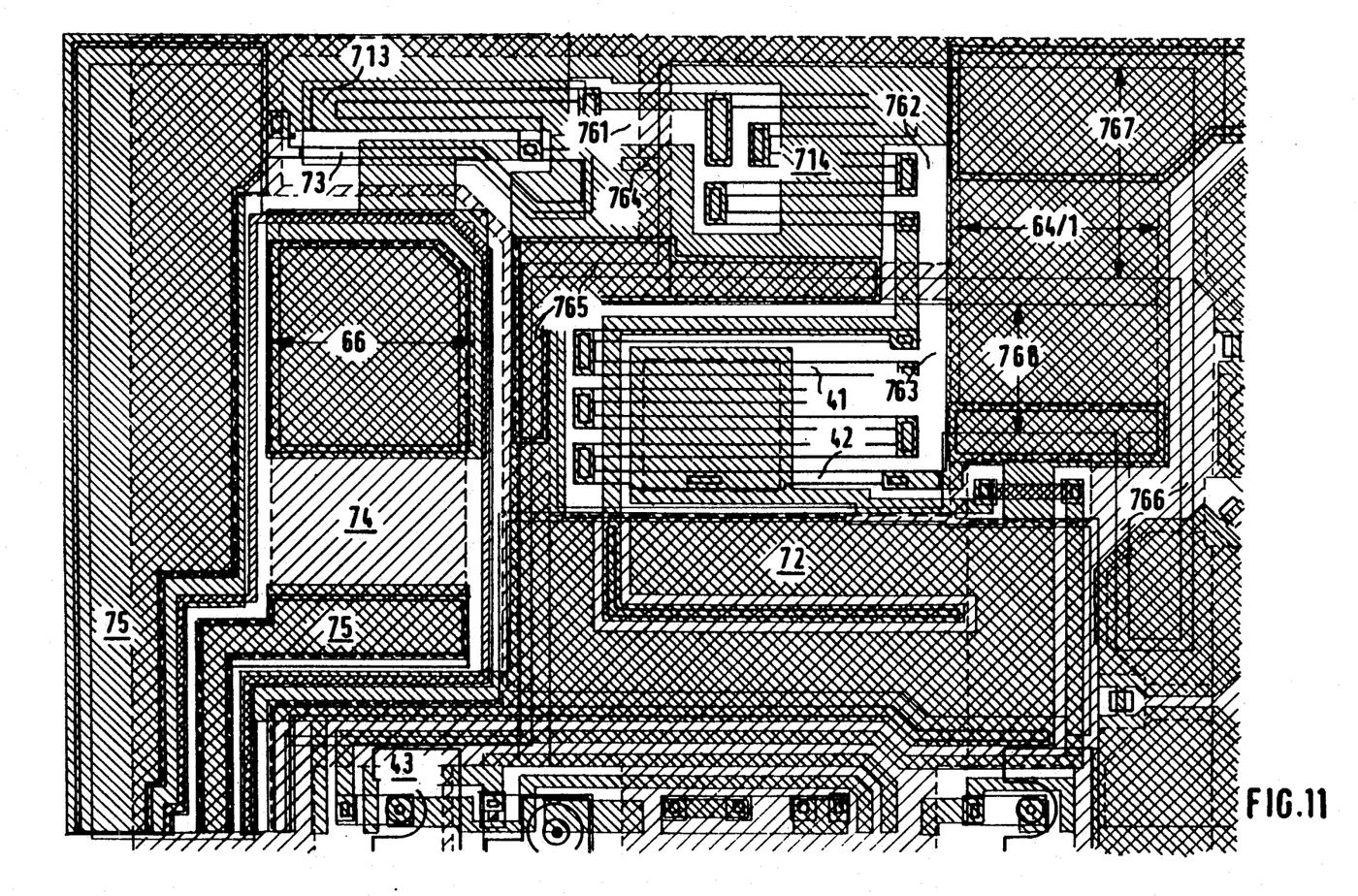
Figure 12:
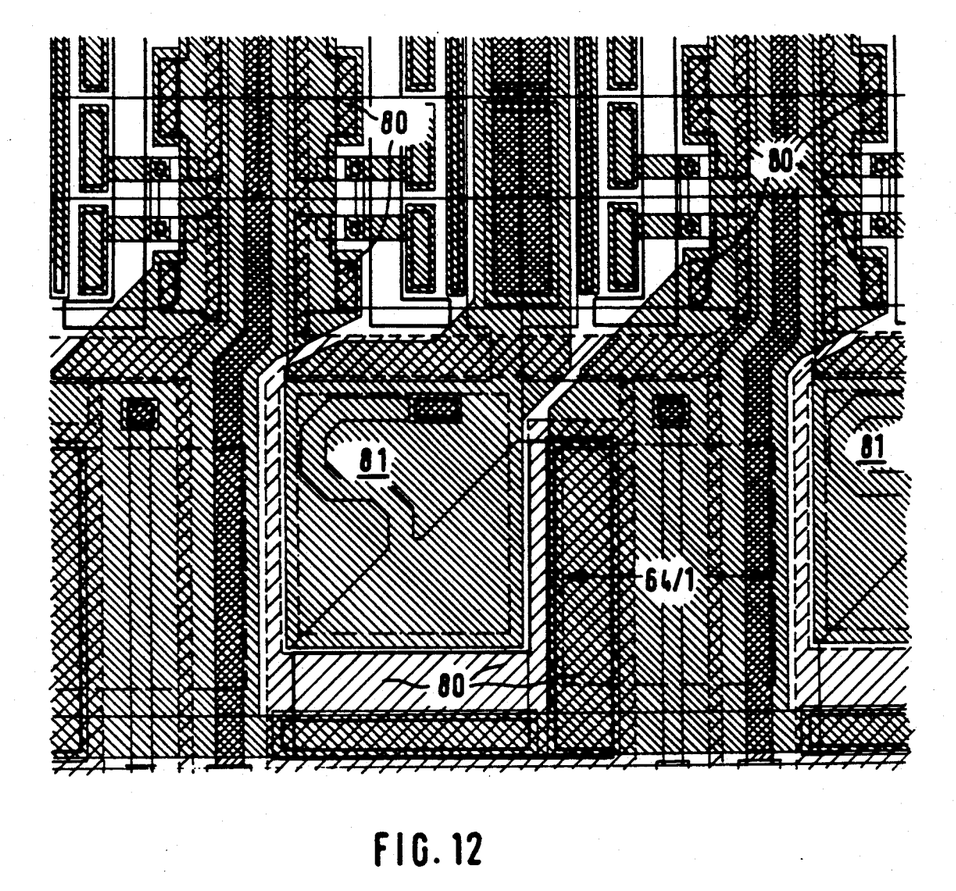
FIG. 12 shows a possible capacitor for damping the output line.
Figure 13:
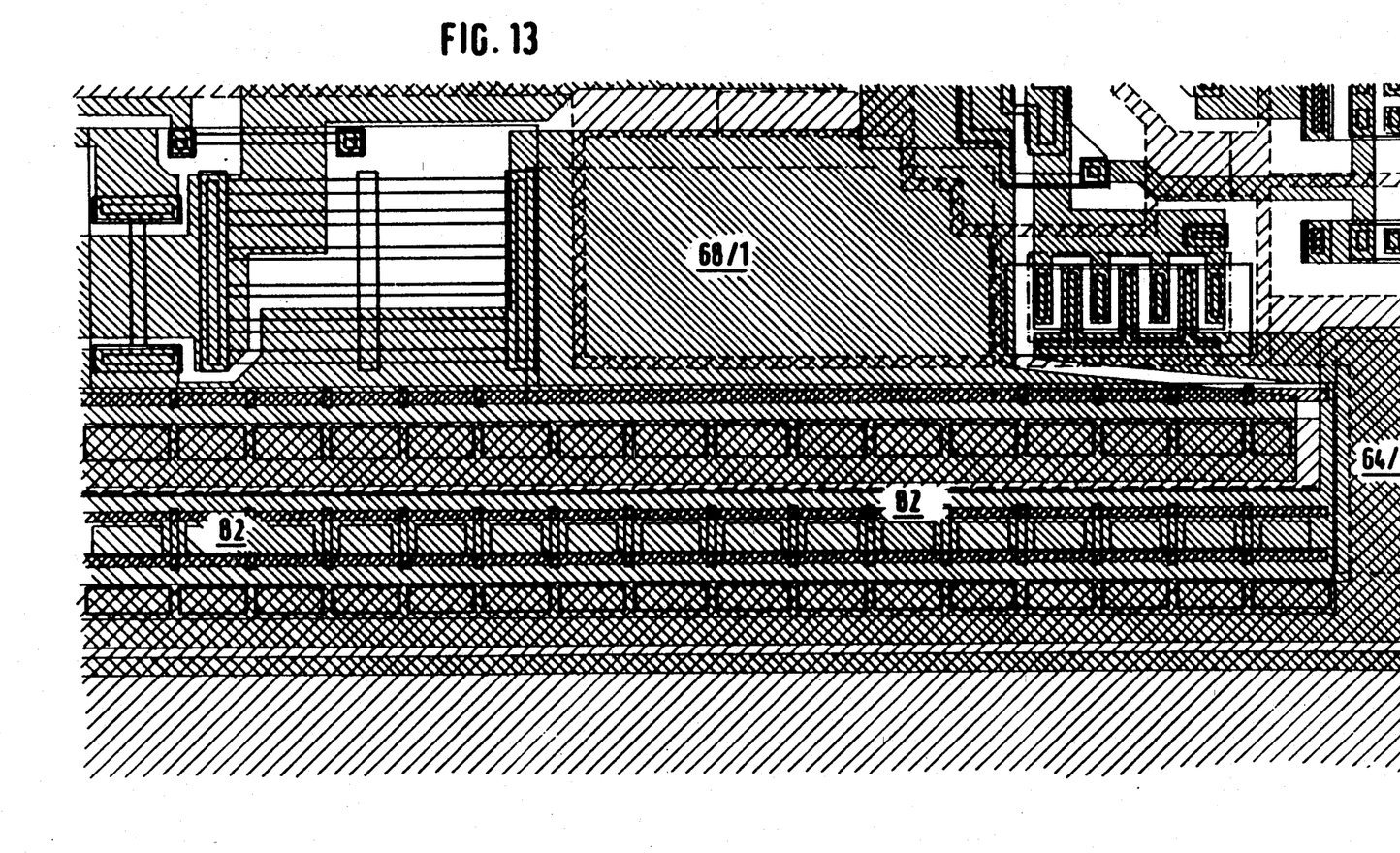
FIG. 13 shows a capacitor for damping the operating current line.

FIG. 11 shows the layout pertaining to the circuit according to FIG. 10; the capacitor 80 with loss resistance 81 is shown in FIG. 12, the capacitor 82 is shown in FIG. 13. The components are again given the same designations.

The additional expenditure of surface for this filter is approximately 0.4 mm², since the precision voltage distributor with the resistors 71, 41 and 42 and the connection locations 66 and 64/1 would also be necessary without the filter.

Figure 14:
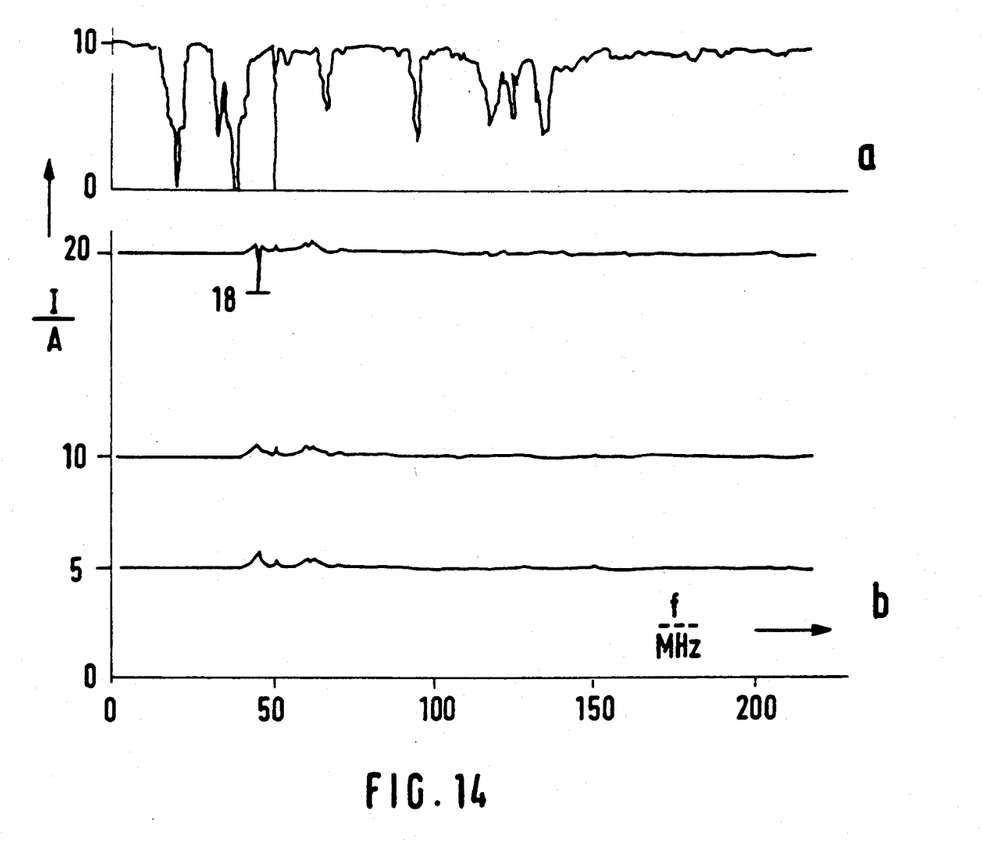
FIG. 14 shows plot diagrams of the achieved result; wherein diagram b shows the effect of a slight infraction of the teaching of the invention; and after correction.

The result is shown in FIGS. 14a, b; FIG. 14a contains an infraction of the teaching of the invention, that is, the demand for freedom from rectified current, whereas FIG. 14b shows the results after the correction of the error. In order to level the characteristic lines completely, a somewhat greater expenditure would be required. The solution accordingly shows an acceptable compromise for the proposed task.

The proposed solutions provide filter circuits which ensure the required electromagnetic compatibility (EMV) using monolithic integration. The EMV filter circuits were constructed, corresponding to their object, as simple low-pass filters, although, of course, they can also be expanded to form a "band-pass" by means of adding a capacitor—in the event that only alternating voltage signals are to be transmitted—or can be expanded to form a filter circuit of a higher order by means of additional elements.

As was already mentioned, it is decisive for the operation of this filter, which is constructed with monolithic integration technology, that the coppknets of the filter—preferably 71 (72), 73, 74 and 75 in the example—do not supply any rectified voltage or rectified current which will be superimposed on the signal voltage or signal current, respectively, and falsify the latter.

Another advantageous solution for preventing rectified voltage or rectified current can be achieved with an expanded technology in that at least one of the components of the filter is arranged on the cover oxide 007 serving for the passivation of the electronic circuit 4 accommodated in the silicon monocrystal or also, in a multiple-layer metallization, on the dielectric intermediate layer 0073 which usually comprises silicon dioxide, silicon nitride or other inorganic or organic dielectrics such as tantalum pentoxide or polyimide lacquer. Resistors of the filter can then be produced by means of more or less highly doped polysilicon, or also metal alloys such as chrome nickel or the like, by means of depositing on the dielectric. Capacitors can also be produced in a particularly advantageous manner with a dielectric which is free of a depletion layer, wherein the counterelectrode can be formed by means of a highly doped region in the silicon; in a process with a metallization in two planes, capacitors are to be constructed with both metal planes as electrodes and the isolating intermediate layer 0073 as dielectric; high specific surface capacitances, that is, extremely thin dielectric layers, are desired in order to obtain small surfaces; these layers are to be protected against punch-through, that is, from overvoltage, in a unipolar or bipolar manner by means of a Zener diode arrangement. The resistor and capacitor can also be combined to form a line. The high-impedance resistance coating simultaneously forms one electrode of the capacitor. The following FIGS. 15 and 16 show a corresponding example.

Also in this instance, a conventional monolithic integrated circuit is used again with bipolar technology with a substrate with low p-type doping as starting material; of course, the teaching of the invention can also be transferred to integrated circuits with more complex structures, complementary structures or structures using unipolar technology (P-MOS, N-MOS, C-MOS).

The substrate and diffusion regions are again designated by 000 to 006, the metal and protective layers by 007 to 009, the epitaxy by 100, and the contact window by 070, and the newly introduced, preferably doped polysilicon is designated by 111. The protective layer 009, which usually lies along the entirety, and the use of multiple-layer metallization are not shown.

Figure 15:
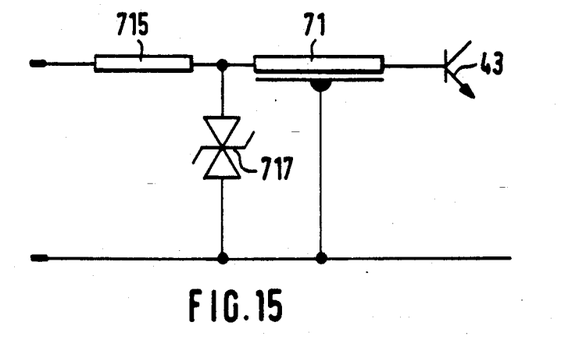
FIG. 15 shows a possible example with another circuit.
Figure 16:
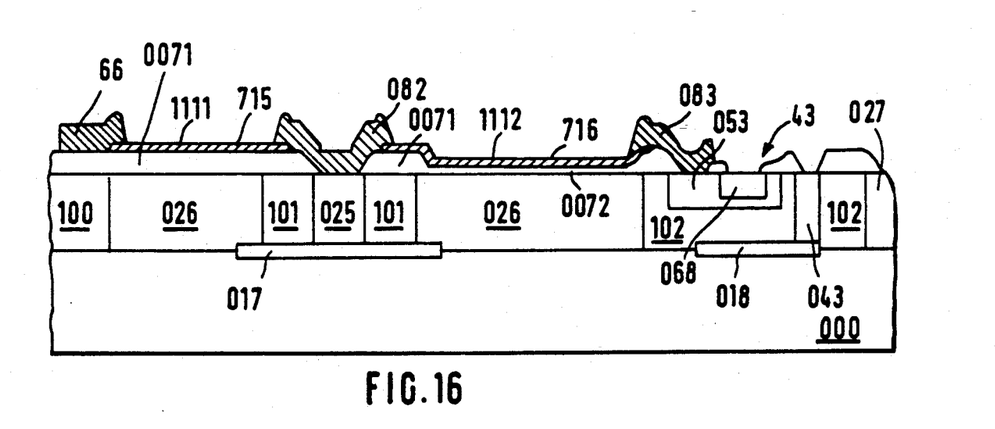
FIG. 16 shows a sectional view of an embodiment of the circuit of FIG. 15.

FIG. 15 shows the shown part of a circuit with a "line" as filter circuit, FIG. 16 shows the respective section through the monolithic integrated circuit.

The resistor 715 of the low-pass filter corresponds to a more or less large part of the resistor 71 of FIG. 9; the capacitor 72 and the remaining part of the resistor 71 are replaced by the "line" 716 with resistance and capacitance coatings; the bipolar Zener diode 717 protects the line from overvoltage which can occur at the input or, in other words, it enables an extremely thin oxide for the capacitance coating of the line 716, whose end is connected with the base of the transistor 43 belonging to the electronic circuit and with the resistor 42, not shown.

The individual parts or regions are designated in the section of FIG. 16 in the same way as in the preceding; by way of addition to the latter, the negative electrode of the Zener diode 717 is formed by the buried layer 017, while 018 belongs to the collector of the transistor 43; the regions 101 are the portions of the epitaxy 100 assigned to the filter, regions 102 are the portions of the epitaxy 100 assigned to the transistor 43; the anodes 025 and 026 of the bipolar Zener diode 717 are formed by the isolating diffusion regions 002, 003, wherein the anode 026 also serves simultaneously as ground electrode of the filter, particularly of the capacitance coating of the line 716; 027 is the insulation of the rest of the circuit; 043 is the collector contact diffusion region of the transistor 43, which is only present in the partial circuit 4 in this example; 053 is its base and 068 is its emitter; 0071 is the thick field oxide on which the metallic connection location 66 of the filter and the partial resistor 715 formed by polysilicon 1111 are arranged, while the resistance coating 1112 of the line 716 is located on the thin oxide 0072, such as e.g. on the emitter oxide of a bipolar process or the gate oxide of a MOS process; the metallic connection of the parts 715 with 716 is designated by 082, that of 716 with the base of transistor 43 is designated by 083; the respective contact windows are 073 and 074. The resistance coating 1112 of the line 716 is arranged in a meandering manner on the larger surface of the thin oxide 0072 in order to achieve a sufficiently great line length. The components in FIG. 15 which are not shown can be produced in the same way; if the capacitor 75 is also constructed as a MOS capacitor, it must also be protected by means of a bipolar Zener diode.

If greater damping is required, the filters are to be constructed in multiple stages in an advantageous manner. The crosstalk brought about by the parasitic components must also be taken into account. If polysilicon and thin oxide are part of the production process of the monolithic integrated circuit, it is always correct to use them as described for the filter, since p-n junctions can only be applied in this technology when the HF amplitudes are already sufficiently damped.

We claim:

1. Electronic device comprising a signal processing circuit part (4) having signal processing circuit elements, at least one line from an external circuit being connected to said signal processing circuit part (4); and circuit means structured as a filter circuit (7) and connected electrically to the signal processing circuit part (4) for damping a high-frequency interference voltage induced by an external electromagnetic field, said high-frequency interference voltage having amplitudes greater than a linear control range of the signal processing circuit elements of the signal processing circuit part (4), wherein the circuit means are assigned to the at least one line (6) and are monolithically integrated, said circuit means comprising circuit means components for damping the high-frequency interference voltage and being constructed so that the greater amplitudes of the high-frequency interference voltage do not generate one of a rectified voltage and a rectified current which noticeably shifts operating points of the signal processing circuit elements, at least one of the components (71, 713, 714, 72, 73, 75, 75) of the circuit means being a region introduced into a monocrystalline semiconductor material and forming a p-n junction with the semiconductor material.

2. Electronic device according to claim 1, wherein the circuit means serving to damp high-frequency interference voltage are monolithically integrated together with the signal processing circuit part (4) or parts of same.

3. Electronic device according to claim 1, further comprising a source for biasing of the p-n junction between said at least one component (71, 713, 714, 72, 73, 74, 75) and the semiconductor material, said source for biasing being structured so that a bias voltage is obtained from a d.c. operating voltage of said circuit means.

4. Electronic device according to claim 3, further comprising a diode (79) connected electrically between the bias voltage source and the p-n junction between said at least one component (71,713,714,72,73,74,75) and the semiconductor material, said diode (79) being connected in a forward flow direction from the bias voltage source to the p-n junction.

5. Electronic device according to claim 3, further comprising another filter circuit between the bias voltage source and the p-n junction between said at least one component (71,713,714,72,73,74,75) and the semiconductor material, said filter circuit comprising at least one resistor (78).

6. Electronic device according to claim 3, further comprising a voltage multiplier circuit connected electrically between the bias voltage source and the p-n junction between said at leas tone component (71,713,714,72,73,74,75) and the semiconductor material, said voltage multiplier circuit. having an output voltage.

7. Electronic device according to claim 6, further comprising means for limiting the output voltage of the voltage multiplier circuit, said means including a stabilizing circuit connected to the voltage multiplier circuit.

8. Electronic device according to claim 1, further comprising counterconnected p-n junctions arranged as amplitude limiters connected electrically between the components of the circuit means and ground.

9. Electronic device according to claim 1, further comprising at least one pair of counterconnected p-n junctions arranged as a capacitive component of the circuit means.

10. Electronic device according to claim 8, wherein the n-p-n or p-n-p structure of the pair of counterconnected p-n junctions, is at least approximately balanced.

11. Electronic device according to claim 1, further comprising at least one resistor (73,74) connected between an input terminal of the circuit means and ground.

12. Electronic device according to claim 11, wherein the resistor (74) connected between the input terminal of the circuit means and ground is constructed so as to have low-impedance, so as to sharply damp the at least one line with an aperiodic damping limit.

13. Electronic device according to claim 12, further comprising a capacitor (75) connected in series with the resistor (74) having the low impedance.

14. Electronic device according to claim 13, wherein the capacitor (75) is formed by two counterconnected diodes.

15. Electronic device according to claim 14, wherein the two counterconnected diodes have an internal bulk resistance so as to be subject to losses.

16. Electronic device according to claim 1, wherein one of the components of the circuit means is a line with a resistance and capacitance coating.

17. Electronic device according to claim 3, wherein the bias voltage acting in a blocking direction is generated from an input alternating voltage to the source for generating the bias voltage comprising the high-frequency interference voltage, by another p-n junction acting as a diode.

18. Electronic device according to claim 1, wherein at least one of the components (71) of the circuit means comprises a plurality of portions (713,714) to reduce parasitic crosstalk.

19. Electronic device according to claim 3, wherein the components of the circuit means are accommodated in at least two separate troughs (761,762,763), said troughs being insulated relative to one another, to reduce parasitic crosstalk.

20. Electronic device according to claim 19, further comprising the independent decoupling networks (764,765) and wherein the troughs (761,762,763), said troughs being insulated relative to one another, are connected with the bias voltage source via the independent decoupling networks (764,765).

21. Electronic device according to claim 19, further comprising a decoupling network (766) and wherein at least two of the troughs (762,763), said troughs being insulated relative to one another, are connected with one another via the decoupling network (766).

22. Electronic device according to claim 1, further comprising dielectric cover layers of the monolithic integrated circuit, and wherein at least one of the components (71, 713 to 716, 74,75) of the circuit means is located on at least one (0071,0072) of the dielectric cover layers to prevent rectified voltage and rectified current.

23. Electronic device according to claim 22, wherein at least one of the components (715) assigned to a connection (66) of the circuit means on an input side of the circuit means is arranged on a thicker one of the dielectric cover layers (0071), on the field oxide, to achieve a greater dielectric strength.

24. Electronic device according to claim 22, wherein at least one of the components (716) remote of a connection (66) of the circuit means on input side of the circuit means is arranged on a thinner one of the dielectric cover layers (0072) to achieve a greater capacitance per unit length.

25. Electronic device according to claim 23, further comprising at least one voltage limiter circuit for protecting components (715) of the circuit means against voltage punch-through.

26. Electronic device according to claim 25, wherein the voltage limiter circuit comprises a Zener diode.

27. Electronic device according to claim 26, wherein said Zener diode is a bipolar Zener diode (717).

28. Electronic device according to claim 27, wherein the bipolar Zener diode (717) is constructed as a symmetrical n-p-n or p-n-p structure (025,017,026).

29. Electronic device according to claim 25, further comprising at least one resistor (715) between the connection (66) of the circuit means on the input side and the voltage limiter circuit.

30. Electronic device according to claim 1, further comprising depletion layer capacitors adapted to the blocking voltage via the degrees of doping.

* * * * *